United States Patent [19]

Khoury

[11] Patent Number: 5,052,580

[45] Date of Patent: Oct. 1, 1991

[54] VEHICLE CARGO STORAGE ORGANIZER

[76] Inventor: Yanka Khoury, 648 Hartford St., Chula Vista, Calif. 92013

[21] Appl. No.: 496,213

[22] Filed: Mar. 19, 1990

[51] Int. Cl.$^5$ .................................................. B60R 5/04
[52] U.S. Cl. ..................................... 220/505; 220/533; 220/551; 220/552; 224/42.42
[58] Field of Search ................. 220/4 A, 22.1, 21, 22, 220/505, 533, 532, 551, 552; 224/42.42

[56] References Cited

U.S. PATENT DOCUMENTS

| | | | |
|---|---|---|---|
| 1,630,140 | 5/1927 | Sibbald | 220/22.1 |
| 2,368,502 | 1/1945 | Troiel | 220/21 |
| 2,840,256 | 6/1958 | Cobb, Jr. | 220/21 |
| 3,067,903 | 12/1962 | Jones, Jr. | 220/22.1 |
| 3,261,492 | 6/1966 | Johnson . | |
| 4,226,348 | 10/1980 | Dottor . | |
| 4,703,855 | 11/1987 | Moe et al. | 220/21 |
| 4,718,584 | 1/1988 | Schoeny . | |

Primary Examiner—Joseph Man-Fu Moy
Attorney, Agent, or Firm—Calif Kip Tervo

[57] ABSTRACT

The vehicle cargo storage organizer has a plurality of first side wall panels and second side wall panels that are used to store or transport a host of differing items. The side wall panels have joining slots that allow the side wall panels to be formed into rectangular storage areas. There are ports in the panels into which a plurality of fastening means can be inserted to give a greater stability to the structure if needed. The side wall panels have a length sizing means to shorten the length of the panels to custom fit the structure. The second side wall panels are higher than the first side wall panels. The joining slots of the second side wall panels can be inserted into the joining slots of the first side wall panels at selected joining slots. The second side wall panels are used form rectangular storage areas that are higher than those formed with only first side wall panels. The higher storage areas can be used to accommodate additional or larger items. The ports also provide a means to lace cord or twine over the tops of the areas to contain items that might become dislodged. The vehicle cargo storage organizer can be preassembled or presented as a kit to be assembled on location as needed.

13 Claims, 1 Drawing Sheet

U.S. Patent      Oct. 1, 1991      5,052,580
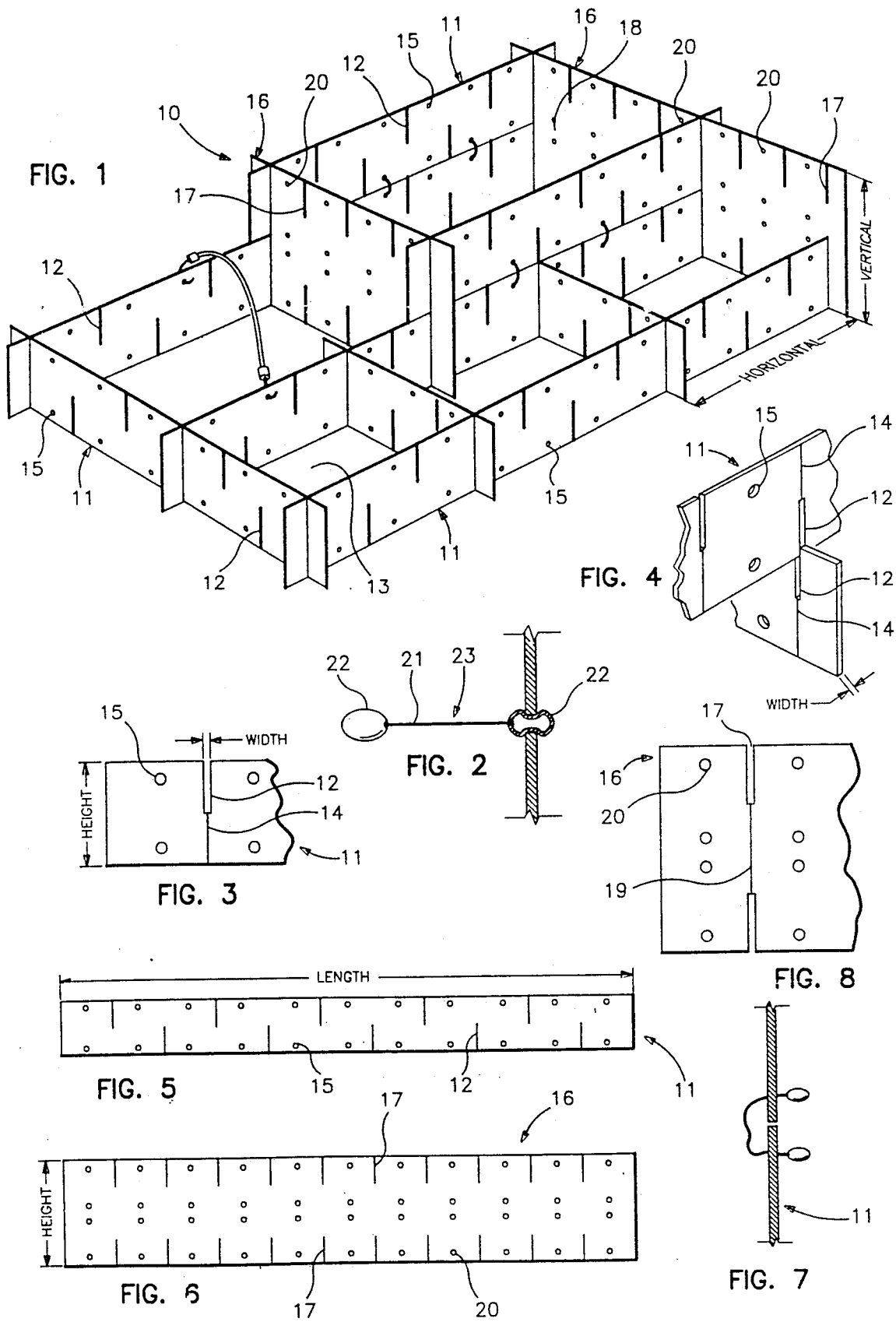

VEHICLE CARGO STORAGE ORGANIZER

BACKGROUND OF THE INVENTION

1. Field of the Invention

This invention relates to a vehicle cargo storage organizer that can be used to store and transport a myriad of items of varying sizes, shapes and descriptions.

2. Description of the Related Art

U.S. Pat. No. 3,261,492 to C. J. Johnson on July 19, 1966 describes a wooded box construction of a set length. The box has a bowed bottom that keeps the sides in tension. It has no capability of expansion either horizontally or vertically.

U.S. Pat. No. 4,226,348 to Frank A. Dottor, et al., on Oct. 7, 1980 shows a grocery bag holder that is placed in an automobile trunk. The holder has sides that fold for storage of the holder. The inner dividers have thin creases on them to allow the forming of partitions. These dividers are placed into t-shaped pockets to hold the dividers in place. There is no vertical size adjustment.

U.S. Pat. No. 4,718,584 to Joseph T. Schoeny on Jan. 12, 1988 describes an accessory for hatchback automobiles and station wagons. There is a center partition with foldable flaps for creating compartments. The sides are connected by hinges.

SUMMARY OF THE INVENTION

The present invention is a simple to install device which serves to segregate items in any area, but most especially, the trunk of a car or rear section of a station wagon. The purpose of the invention is to provide a means of establishing individual cells for storage within a trunk of an automobile. The invention is simple to assemble, install and disassemble. The length of the divider panels may be altered and the storage organizer custom fitted for an individual area.

Many vehicles have large areas that are used for storage and hauling. Often these areas are filled with items that need to be transported separately to reduce the chance that one item may damage the others during transport. Tomatoes, clothes and tools are a combination that could lead to a mess if allowed to roll around together. If the vehicle is used for business, organization of product lines and literature is not only convenient but necessary.

The first and second side wall panels have a series of joining slots. The slot of one panel is inserted into the slot of another panel at selected locations to form the rectangular structure shown in FIG. 1. The slots are cut to a length that allows a stable structure. A compartment of greater height may be formed by interconnecting first side wall panels and second side wall panels.

The second side wall panels are approximately twice the height of the first side wall panels. To form a higher compartment, the joining slots of two opposing second side wall panels are placed in selected joining slots of two opposing first side wall panels. Additional first side wall panels are placed over the previously placed first side wall panels. The joining slots of the first side wall panels are then placed into the joining slots of the second side wall panels.

Many combinations of side wall panels can be used to provide the user with a wide variety of rectangular storage areas. The length of the first and second side wall panels may be shortened by flexing or cutting the panels at the length sizing means. The length sizing means of the panels are constructed of a plurality of scored grooves or perforations.

The stability of the structure can be greatly enhanced by placing two or more fastening means into the ports. The ports are placed at selected intervals near the edge of the first and second side wall panels. The fastening means are preferably made of an elastic cord with a resilient bulb or ball at the ends of the cord. However, other means for fastening could be used. The bulb is flexible and small enough to be squeezed through the ports. Once through the ports, the bulb expands and the cord is secured. The first side wall panels may be fastened to each other or to the second side wall panels using the fastening means.

The first or second side wall panels may be used as a cover by using the fastening means as a hinge to pivot one panel on another. A cover could be useful to keep items from spilling out of the storage areas. The user may find it useful to use a "Bungee" cord to secure an item using the ports to attach the cord or to lace a cord or twine through the ports to secure items in the storage areas.

A structure for segregating items is described that has a plurality of first side wall panels. The first side wall panels have a plurality of first joining slots alternately and oppositely spaced apart. The first side wall panels are releasingly joined to each other at selected first joining slots by slidingly inserting the selected first joining slots into each other to form at least one rectangular storage area. There are a plurality of first length sizing means diametrically opposed to and connected to each of the plurality of first joining slots in the first side wall panels. The first length sizing means extend to a longitudinal edge of the first side wall panels and are used to selectively shorten the length of the first side wall panels as required.

A plurality of second side wall panels have a plurality of second joining slots that are spaced apart in diametric pairs. The second side wall panels are releasingly joined to the first side wall panels at selected joining slots by slidingly inserting the selected second joining slots into the selected first joining slots to form a second rectangular storage area. There are a plurality of second length sizing means that connect the diametrically opposed second joining means. The second length sizing means are used to selectively shorten the length of the second side wall panels.

The first joining slots may have a length of at least one half of a height of the first side wall panels and may have a width approximately equal to a width of the first side wall panels. The plurality of first length sizing means may be a plurality of scored grooves.

The second joining slots may have a length of at least one half of the height of the first side wall panels and may have a width approximately equal to the width of the first side wall panels. The plurality of second length sizing means may be a plurality of scored grooves.

The second side wall panels may have a height greater than the length of two second joining slots and the height of the second side wall panels may be approximately equal to twice the height of the first side wall panels.

There may be a plurality of first ports in the first side wall panels and a plurality of second ports in the second side wall panels. The first ports may be approximately equidistant horizontally from each other and on a plane parallel to a horizontal axis of the first side wall panels.

The second ports may be approximately equidistant horizontally from each other and on parallel horizontal and vertical planes to the first ports in the first side wall panels.

A plurality of fastening means may be placed in the first ports to releasingly connect at least two first side wall panels together. The plurality of fastening means may also be placed in the second ports and in the first ports to releasingly connect at least one second side wall panel to at least one first side wall panel. The fastening means may be a plurality of elastic cords with a resilient bulb attached to each opposing end.

The elements of the structure may be made into a kit to build a structure for segregating items and assembled where needed or sold already assembled.

It is an object of this invention is to provide a structure that has individual storage areas. Items that might be damaged or soiled, if stored together, may be placed in separate storage areas.

It is another object of this invention to provide a simple to assemble, install and disassemble vehicle cargo storage organizer that can be used to store a myriad of items of varying sizes, shapes and descriptions.

It is yet another object of this invention to provide a storage organizer featuring side wall panels that may be shortened to create smaller storage areas.

It is another object of this invention to provide a storage organizer that may have compartments of greater height to accommodate larger items or to store additional items without increasing the length or width of the compartment.

It is another object of this invention to provide a storage organizer that has fastening means that add to the stability of the structure. The fastening means can be used to fasten one or more of the side wall panels of the structure together or to use a panel as a cover or lid to keep items from spilling out over the top of the walls.

It is also an object of this invention to provide a kit that can be assembled into a vehicle cargo storage organizer.

BRIEF DESCRIPTION OF THE DRAWINGS

FIG. 1 is a perspective view of the Vehicle Cargo Storage Organizer showing both horizontal and vertical expansion. The view shows an item retaining means such as a "Bungee" elastic cord or a length of twine to restrain items within the storage area and shows one of the ways a fastening means may be used.

FIG. 2 is a front view of a fastening means with one of the resilient bulbs being pressed through a port.

FIG. 3 is an expanded partial view of a first side wall panel showing a joining slot, the scored groove of the first length sizing means and a first port.

FIG. 4 is an expanded partial view of two first side wall panels being assembled by inserting one first joining slot into another first joining slot.

FIG. 5 is a front view of a first side wall panel.

FIG. 6 is a front view of a second side wall panel of the Vehicle Cargo Storage Organizer.

FIG. 7 is a partial expanded view of a fastening means showing the resilient bulbs pressed through a pair of ports to fasten two adjacent side wall panels together.

FIG. 8 is a partial expanded view of a second side wall panel showing the scored grooves of the second length sizing means.

DESCRIPTION OF THE PREFERRED EMBODIMENT

Referring to FIGS. 1 through 8, a structure 10 for segregating items is shown. The structure 10 has a plurality of first side wall panels 11 that have a plurality of first joining slots 12. The first joining slots 12 are alternately and oppositely spaced apart. The first joining slots 12 have a length of at least one half of the height of the first side wall panel 11 and have a width approximately equal to a width of the first side wall panel 11. The first side wall panels 11 are releasingly joined to each other at selected first joining slots 12 (see FIGS. 1 and 3). This is accomplished by slidingly inserting the selected first joining slots 12 into each other to form at least one rectangular storage area as represented by rectangular storage area 13. There are a plurality of perforations or scored grooves 14 diametrically opposed to and connected to each of the plurality of first joining slots 12 in the first side wall panels 11. These are used to shorten a length of the first side wall panels 11. There are a plurality of first ports 15, approximately equidistant horizontally from each other, in the first side wall panels 11. The first ports 15 are in a plane parallel to a longitudinal axis of the first side wall panels 11.

There are a plurality of second side wall panels 16. These second side wall panels 16 have a plurality of second joining slots 17 spaced apart in diametric pairs. The second joining slots 17 have a length of at least one half of the height of the first side wall panels 11 and have a width approximately equal to the width of the first side wall panels 11. The second side wall panels 16 are releasingly joined to the first side wall panels 11 at selected joining slots (see FIGS. 1 and 4). This is done by slidingly inserting the selected second joining slots into the selected first joining slots to form a second rectangular storage area as represented by second rectangular storage area 18. The second side wall panels 16 have a height greater than the length of two second joining slots 17. The height of the second side wall panels 16 are approximately equal to twice the height of the first side wall panels 11. There are a plurality of perforations or scored grooves 19 connecting diametrically opposed second joining slots 17.

There are a plurality of second ports 20, approximately equidistant horizontally from each other, in the second side wall panels 16. See FIG. 6. The second ports 20 are on parallel horizontal and vertical planes to the first ports 15 in the first side wall panels 11.

There are a plurality of fastening means 23 with elastic cords 21 that have a resilient bulb 22 attached to each opposing end (see FIG. 2). The fastening means 23 are placed in the first ports 15 (see FIG. 1) to releasingly connect at least two first side wall panels 11 together. The fastening means 23 are also placed in the second ports 20 and in the first ports 15 to releasingly connect at least one second side wall panel 16 to at least one first side wall panel 11.

All the above elements may be supplied as a kit and assembled at the vehicle or any other place that the structure 10 may be needed.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A structure for segregating items comprising:
at least one rectangular storage area comprising:
  a plurality of first side wall panels having a plurality of first joining slots alternately and oppositely spaced apart; the first side wall panels being releasingly joined to each other at selected first joining slots by slidingly inserting the selected first joining slots into each other the first side wall panels having a plurality of first length sizing means diametrically opposed to and connected to each of the plurality of first joining slots in the first side wall panels and extending to a longitudinal edge of the first side wall panels to shorten a length of the first side wall panels; and
a second rectangular storage area comprising:
  a pair of second side wall panels having a height of approximately twice the height of the first side wall panels and having a plurality of second joining slots spaced apart in diametric pairs; the second side wall panels being releasingly joined to the first side wall panels at selected joining slots by slidingly inserting the selected second joining slots into the selected first joining slots to form two walls of the second rectangular storage area; the second side wall panels having a plurality of second length sizing means connecting the diametrically opposed second joining means to shorten a length of the second side wall panels; and
  a pair of the first side wall panels, each releasingly joined to both of the second side wall panels at the diametric paired joining slots to form the upper sections of the other two walls of the second rectangular area.

2. A structure for segregating items as described in claim 1 wherein the first joining slots have a length of at least one half of a height of the first side wall panels and have a width approximately equal to a width of the first side wall panels.

3. A structure for segregating items as described in claim 1 wherein the plurality of first length sizing means further comprises a plurality of scored grooves.

4. A structure for segregating items as described in claim 1 wherein the second joining slots have a length of at least one half of the height of the first side wall panels and have a width approximately equal to the width of the first side wall panels.

5. A structure for segregating items as described in claim 1 wherein the plurality of second length sizing means further comprises a plurality of scored grooves.

6. A kit to build a structure for segregating items comprising:
  a. a plurality of first side wall panels having a plurality of first joining slots alternately and oppositely spaced apart;
  b. the first joining slots having a length of at least one half of a height of the first side wall panels and having a width approximately equal to a width of the first side wall panels;
  c. the first side wall panels capable of being releasingly joined to each other at selected first joining slots by slidingly inserting the selected first joining slots into each other to form at least one rectangular storage area;
  d. a plurality of scored grooves diametrically opposed to and connected to each of the plurality of first joining slots in the first side wall panels and extending to a longitudinal edge of the first side panels to shorten a length of the first side wall panels;
  e. a plurality of first ports, approximately equidistant horizontally from each other, in the first side wall panels and in a plane parallel to a longitudinal axis of the first side wall panels;
  f. a plurality of second side wall panels having a plurality of second joining slots spaced apart in diametric pairs;
  g. the second joining slots having a length of at least one half of the height of the first side wall panels and having a width approximately equal to the width of the first side wall panels;
  h. the second side wall panels capable of being releasingly joined to the first side wall panels at selected joining slots by slidingly inserting the selected second joining slots into the selected first joining slots to form a second rectangular storage area;
  i. the second side wall panels having a height greater than the length of two second joining slots and the height of the second side wall panels being approximately equal to twice the height of the first side wall panels;
  j. a plurality of scored grooves connecting diametrical second joining means to shorten a length of the second side wall panels;
  k. a plurality of second parts, approximately equidistant horizontally from each other, in the second side wall panels and on parallel horizontal and vertical planes to the first ports in the first side wall panels; and
  l. a plurality of elastic cords with a resilient bulb attached to each opposing end and capable of being placed in the first ports to releasingly connect at least two first side wall panels together and capable of being placed in the second ports and in the first ports to releasing connect at least one second side wall panel to at least one side wall panel.

7. A structure for segregating items comprising:
  a. a plurality of first side wall panels having a plurality of first joining slots alternately and oppositely spaced apart;
  b. the first joining slots having a length of at least one half of a height of the first side wall panels and having a width approximately equal to a width of the first side wall panels;
  c. the first side wall panels being releasingly joined to each other at selected first joining slots by slidingly inserting the selected first joining slots into each other to form at least one rectangular storage area;
  d. a plurality of scored grooves diametrically opposed to and connected to each of the plurality of first joining slots in the first side wall panels and extending to a longitudinal edge of the first side wall panels to shorten a length of the first side wall panels;
  e. a plurality of second side wall panels having a plurality of second joining slots spaced apart in diametric pairs;
  f. the second joining slots having a length of at least one half of the height of the first side wall panels and having a width approximately equal to the width of the first side wall panels;
  g. the second side wall panels being releasingly joined to the first side wall panels at selected joining slots by slidingly inserting the selected second joining slots into the selected first joining slots to form a second rectangular storage area;

h. the second side wall panels having a height greater than the length of two second joining slots and the height of the second side wall panels being approximately equal to twice the height of the first side wall panels; and i. a plurality of scored grooves connecting diametrical second joining means to shorten a length of the second side wall panels.

8. A structure for segregating items as described in claim 7 further comprising:
   a. a plurality of first ports in the first side wall panels; and
   b. a plurality of second ports in the second side wall panels.

9. A structure for segregating items as described in claim 8 wherein the first ports further comprise being approximately equidistant horizontally from each other and on a plane parallel to a horizontal axis of the first side wall panels.

10. A structure for segregating items as described in claim 8 wherein the second ports further comprise being approximately equidistant horizontally from each other and on parallel horizontal and vertical planes to the first ports in the first side wall panels.

11. A structure for segregating items as described in claim 7 further comprising a plurality of fastening means placed in the first ports to releasingly connect at least two first side wall panels together.

12. A structure for segregating items as described in claim 11 wherein the fastening means further comprise a plurality of elastic cords with a resilient bulb attached to each opposing end.

13. A structure for segregating items comprising:
   a. a plurality of first side wall panels having a plurality of first joining slots alternately and oppositely spaced apart;
   b. the first joining slots having a length of at least one half of a height of the first side wall panels and having a width approximately equal to a width of the first side wall panels;
   c. the first side wall panels being releasingly joined to each other at selected first joining slots by slidingly inserting the selected first joining slots into each other to form at least one rectangular storage area;
   d. a plurality of scored grooves diametrically opposed to and connected to each of the plurality of first joining slots in the first side wall panels and extending to a longitudinal edge of the first side wall panels to selectively shorten a length of the first side wall panels;
   e. a plurality of first ports, approximately equidistant horizontally from each other, in the first side wall panels and in a plane parallel to a longitudinal axis of the first side wall panels;
   f. a plurality of second side wall panels having a plurality of second joining slots spaced apart in diametric pairs;
   g. the second joining slots having a length of at least one half of the height of the first side wall panels and having a width approximately equal to the width of the first side wall panels;
   h. the second side wall panels being releasingly joined to the first side wall panels at selected joining slots by slidingly inserting the selected second joining slots into the selected first joining slots to form a second rectangular storage area;
   i. the second side wall panels having a height greater than the length of two second joining slots and the height of the second side wall panels being approximately equal to twice the height of the first side wall panels;
   j. a plurality of scored grooves connecting diametrically opposed second joining means to shorten a length of the second side wall panels;
   k. a plurality of second ports, approximately equidistant horizontally from each other, in the second side wall panels and on parallel horizontal and vertical planes to the first ports in the first side wall panels; and
   l. a plurality of elastic cords with a resilient bulb attached to each opposing end and placed in the first ports to releasingly connect at least two first side wall panels together and placed in the second ports and in the first ports to releasing connect at least one second side wall panel to at least one first side wall panel.

* * * * *